United States Patent
Kwatra et al.

(10) Patent No.: US 8,958,571 B2
(45) Date of Patent: Feb. 17, 2015

(54) MIC COVERING DETECTION IN PERSONAL AUDIO DEVICES

(75) Inventors: Nitin Kwatra, Austin, TX (US); Jeffrey Alderson, Austin, TX (US); Jon D. Hendrix, Wimberly, TX (US)

(73) Assignee: Cirrus Logic, Inc., Austin, TX (US)

( * ) Notice: Subject to any disclaimer, the term of this patent is extended or adjusted under 35 U.S.C. 154(b) by 556 days.

(21) Appl. No.: 13/249,711

(22) Filed: Sep. 30, 2011

(65) Prior Publication Data

US 2012/0310640 A1    Dec. 6, 2012

Related U.S. Application Data

(60) Provisional application No. 61/493,162, filed on Jun. 3, 2011.

(51) Int. Cl.
*G10L 15/00* (2013.01)
*G10L 15/20* (2006.01)
(Continued)

(52) U.S. Cl.
CPC ...... *G10K 11/1784* (2013.01); *G10K 2210/108* (2013.01); *G10K 2210/30231* (2013.01); *G10K 2210/30391* (2013.01); *G10K 2210/503* (2013.01)
USPC ...... 381/94.1; 704/226; 455/575.2; 381/71.1; 381/71.11; 381/123; 381/71.6; 381/92; 381/365; 381/59; 381/94.2; 381/119; 381/66; 381/86; 381/72; 381/60; 381/71.2; 381/94.3; 381/71.4; 381/122; 381/58; 381/71.7; 381/56; 381/375; 381/26; 381/71.9; 381/73.1; 381/313; 381/95; 381/57; 381/312; 381/94.7

(58) Field of Classification Search
USPC .............. 704/200–257, 270, 275; 455/575.2; 381/71.1, 71.11, 123, 71.6, 92, 365, 381/59, 94.2, 119, 66, 86, 72, 60, 71.2, 381/94.3, 71.4, 122, 58, 71.7, 56, 375, 26, 381/71.9, 73.1, 313, 95, 57, 312, 94.7, 58.7
See application file for complete search history.

(56) References Cited

U.S. PATENT DOCUMENTS 5,251,263 A    10/1993    Andrea et al.
5,337,365 A     8/1994    Hamabe et al.
(Continued)

FOREIGN PATENT DOCUMENTS

EP    2395500 A1    12/2011
GB    2401744 A     11/2004
(Continued)

OTHER PUBLICATIONS

Pfann, et al., "LMS Adaptive Filtering with Delta-Sigma Modulated Input Signals," IEEE Signal Processing Letters, Apr. 1998, pp. 95-97, vol. 5, No. 4, IEEE Press, Piscataway, NJ.
(Continued)

*Primary Examiner* — Paras D Shah
*Assistant Examiner* — Anne Thomas-Homescu
(74) *Attorney, Agent, or Firm* — Mitch Harris, Atty at Law, LLC; Andrew M. Harris (57) ABSTRACT

A personal audio device, such as a wireless telephone, includes noise canceling circuit that adaptively generates an anti-noise signal from a reference microphone signal and injects the anti-noise signal into the speaker or other transducer output to cause cancellation of ambient audio sounds. An error microphone may also be provided proximate the speaker to estimate an electro-acoustical path from the noise canceling circuit through the transducer. A processing circuit uses the reference and/or error microphone, optionally along with a microphone provided for capturing near-end speech, to determine whether one of the reference or error microphones is obstructed by comparing their received signal content and takes action to avoid generation of erroneous anti-noise.

25 Claims, 6 Drawing Sheets (51) Int. Cl.

| | | |
|---|---|---|
| G10L 21/00 | (2013.01) | |
| G10L 21/02 | (2013.01) | |
| H04M 1/00 | (2006.01) | |
| A61F 11/06 | (2006.01) | |
| G10K 11/16 | (2006.01) | |
| H03B 29/00 | (2006.01) | |
| H02B 1/00 | (2006.01) | |
| H04R 3/00 | (2006.01) | |
| H04R 21/02 | (2006.01) | |
| H04B 1/00 | (2006.01) | |
| G10K 11/178 | (2006.01) | |
| H04R 25/00 | (2006.01) | |
| H04B 3/20 | (2006.01) | |
| H04R 29/00 | (2006.01) | |
| H04B 15/00 | (2006.01) | |
| H04R 3/02 | (2006.01) | |
| H03G 3/20 | (2006.01) | |
| H04R 5/00 | (2006.01) | |

(56) References Cited

U.S. PATENT DOCUMENTS

| | | | |
|---|---|---|---|
| 5,425,105 A | 6/1995 | Lo et al. | |
| 5,586,190 A | 12/1996 | Trantow et al. | |
| 5,640,450 A | 6/1997 | Watanabe | |
| 5,699,437 A | 12/1997 | Finn | |
| 5,706,344 A | 1/1998 | Finn | |
| 5,768,124 A | 6/1998 | Stothers et al. | |
| 5,815,582 A | 9/1998 | Claybaugh et al. | |
| 5,946,391 A | 8/1999 | Dragwidge et al. | |
| 5,991,418 A | 11/1999 | Kuo | |
| 6,041,126 A | 3/2000 | Terai et al. | |
| 6,118,878 A | 9/2000 | Jones | |
| 6,219,427 B1 | 4/2001 | Kates et al. | |
| 6,418,228 B1 | 7/2002 | Terai et al. | |
| 6,434,246 B1 | 8/2002 | Kates et al. | |
| 6,434,247 B1 | 8/2002 | Kates et al. | |
| 6,768,795 B2 | 7/2004 | Feltstrom et al. | |
| 6,850,617 B1 | 2/2005 | Weigand | |
| 7,103,188 B1* | 9/2006 | Jones | 381/71.9 |
| 7,181,030 B2 | 2/2007 | Rasmussen et al. | |
| 7,330,739 B2 | 2/2008 | Somayajula | |
| 7,365,669 B1 | 4/2008 | Melanson | |
| 7,742,790 B2 | 6/2010 | Konchitsky et al. | |
| 8,019,050 B2 | 9/2011 | Mactavish et al. | |
| 8,249,262 B2* | 8/2012 | Chua et al. | 381/60 |
| 8,290,537 B2 | 10/2012 | Lee et al. | |
| 8,379,884 B2 | 2/2013 | Horibe et al. | |
| 2001/0053228 A1 | 12/2001 | Jones | |
| 2002/0003887 A1 | 1/2002 | Zhang et al. | |
| 2004/0165736 A1 | 8/2004 | Hetherington et al. | |
| 2004/0167777 A1 | 8/2004 | Hetherington et al. | |
| 2004/0264706 A1 | 12/2004 | Ray et al. | |
| 2005/0117754 A1 | 6/2005 | Sakawaki | |
| 2006/0153400 A1* | 7/2006 | Fujita et al. | 381/95 |
| 2007/0030989 A1 | 2/2007 | Kates | |
| 2007/0038441 A1* | 2/2007 | Inoue et al. | 704/226 |
| 2007/0053524 A1* | 3/2007 | Haulick et al. | 381/92 |
| 2007/0076896 A1 | 4/2007 | Hosaka et al. | |
| 2007/0154031 A1* | 7/2007 | Avendano et al. | 381/92 |
| 2007/0258597 A1* | 11/2007 | Rasmussen et al. | 381/26 |
| 2007/0297620 A1* | 12/2007 | Choy | 381/73.1 |
| 2008/0019548 A1* | 1/2008 | Avendano | 381/313 |
| 2008/0181422 A1 | 7/2008 | Christoph | |
| 2008/0226098 A1 | 9/2008 | Haulick et al. | |
| 2009/0012783 A1* | 1/2009 | Klein | 704/226 |
| 2009/0034748 A1* | 2/2009 | Sibbald | 381/71.6 |
| 2009/0041260 A1 | 2/2009 | Jorgensen et al. | |
| 2009/0046867 A1 | 2/2009 | Clemow | |
| 2009/0196429 A1* | 8/2009 | Ramakrishnan et al. | 381/26 |
| 2009/0220107 A1* | 9/2009 | Every et al. | 381/94.7 |
| 2009/0238369 A1* | 9/2009 | Ramakrishnan et al. | 381/56 |
| 2009/0245529 A1 | 10/2009 | Asada et al. | |
| 2009/0290718 A1* | 11/2009 | Kahn et al. | 381/57 |
| 2009/0296965 A1 | 12/2009 | Kojima | 381/312 |
| 2009/0304200 A1* | 12/2009 | Kim et al. | 381/71.11 |
| 2010/0014683 A1 | 1/2010 | Maeda et al. | |
| 2010/0014685 A1 | 1/2010 | Wurm | |
| 2010/0061564 A1 | 3/2010 | Clemow et al. | |
| 2010/0069114 A1 | 3/2010 | Lee et al. | |
| 2010/0082339 A1 | 4/2010 | Konchitsky et al. | |
| 2010/0098263 A1 | 4/2010 | Pan et al. | |
| 2010/0124336 A1 | 5/2010 | Shridhar et al. | |
| 2010/0166203 A1 | 7/2010 | Peissig et al. | |
| 2010/0195838 A1* | 8/2010 | Bright | 381/57 |
| 2010/0195844 A1 | 8/2010 | Christoph et al. | |
| 2010/0272283 A1 | 10/2010 | Carreras et al. | |
| 2010/0274564 A1 | 10/2010 | Bakalos et al. | |
| 2010/0296666 A1 | 11/2010 | Lin | |
| 2010/0296668 A1 | 11/2010 | Lee et al. | |
| 2010/0310086 A1 | 12/2010 | Magrath et al. | |
| 2010/0322430 A1 | 12/2010 | Isberg | |
| 2011/0007907 A1 | 1/2011 | Park et al. | |
| 2011/0106533 A1 | 5/2011 | Yu | |
| 2011/0142247 A1 | 6/2011 | Fellers et al. | |
| 2011/0144984 A1* | 6/2011 | Konchitsky | 704/226 |
| 2011/0158419 A1 | 6/2011 | Theverapperuma et al. | |
| 2011/0222698 A1* | 9/2011 | Asao et al. | 381/71.1 |
| 2011/0249826 A1 | 10/2011 | Van Leest | |
| 2011/0288860 A1 | 11/2011 | Schevciw et al. | |
| 2011/0293103 A1 | 12/2011 | Park et al. | |
| 2011/0299695 A1* | 12/2011 | Nicholson | 381/71.6 |
| 2011/0317848 A1* | 12/2011 | Ivanov et al. | 381/94.2 |
| 2012/0135787 A1* | 5/2012 | Kusunoki et al. | 455/575.8 |
| 2012/0140943 A1 | 6/2012 | Hendrix et al. | |
| 2012/0207317 A1 | 8/2012 | Abdollahzadeh Milani et al. | |
| 2012/0300958 A1* | 11/2012 | Klemmensen | 381/81 |
| 2012/0308021 A1 | 12/2012 | Kwatra et al. | |
| 2012/0308024 A1 | 12/2012 | Alderson et al. | |
| 2012/0308025 A1 | 12/2012 | Hendrix et al. | |
| 2012/0308026 A1 | 12/2012 | Kamath et al. | |
| 2012/0308027 A1 | 12/2012 | Kwatra | |
| 2012/0308028 A1 | 12/2012 | Kwatra et al. | |
| 2013/0010982 A1* | 1/2013 | Elko et al. | 381/94.2 |
| 2013/0243225 A1* | 9/2013 | Yokota | 381/300 |
| 2013/0272539 A1* | 10/2013 | Kim et al. | 381/92 |
| 2013/0287218 A1 | 10/2013 | Alderson et al. | |
| 2013/0287219 A1 | 10/2013 | Hendrix et al. | |
| 2013/0301842 A1 | 11/2013 | Hendrix et al. | |
| 2013/0301846 A1 | 11/2013 | Alderson et al. | |
| 2013/0301847 A1 | 11/2013 | Alderson et al. | |
| 2013/0301848 A1 | 11/2013 | Zhou et al. | |
| 2013/0301849 A1 | 11/2013 | Alderson et al. | |
| 2013/0343556 A1* | 12/2013 | Bright | 381/71.1 |
| 2013/0343571 A1* | 12/2013 | Rayala et al. | 381/92 |
| 2014/0050332 A1* | 2/2014 | Nielsen et al. | 381/92 |
| 2014/0177851 A1* | 6/2014 | Kitazawa et al. | 381/56 |

FOREIGN PATENT DOCUMENTS

| | | |
|---|---|---|
| GB | 2455821 A | 6/2009 |
| GB | 2455824 A | 6/2009 |
| GB | 2455828 A | 6/2009 |
| JP | H06-186985 A | 7/1994 |
| WO | WO 2007007916 A1 | 1/2007 |
| WO | WO 2007113487 A1 | 11/2007 |
| WO | WO 2010117714 A1 | 10/2010 |
| WO | WO 2012134874 A1 | 10/2012 |

OTHER PUBLICATIONS

Kuo, et al., "Active Noise Control: A Tutorial Review," Proceedings of the IEEE, Jun. 1999, pp. 943-973, vol. 87, No. 6, IEEE Press, Piscataway, NJ.
U.S. Appl. No. 14/029,159, filed Sep. 17, 2013, Li, et al.
U.S. Appl. No. 14/062,951, filed Oct. 25, 2013, Zhou, et al.
U.S. Appl. No. 13/686,353, filed Nov. 27, 2012, Hendrix, et al.
U.S. Appl. No. 13/795,160, filed Mar. 12, 2013, Hendrix, et al.
U.S. Appl. No. 13/692,367, filed Dec. 3, 2012, Alderson, et al.
U.S. Appl. No. 13/722,119, filed Dec. 20, 2012, Hendrix, et al.
U.S. Appl. No. 13/727,718, filed Dec. 27, 2012, Alderson, et al.

(56) References Cited

OTHER PUBLICATIONS

U.S. Appl. No. 13/784,018, filed Mar. 4, 2013, Alderson, et al.
U.S. Appl. No. 13/787,906, filed Mar. 7, 2013, Alderson, et al.
U.S. Appl. No. 13/729,141, filed Dec. 28, 2012, Zhou, et al.
U.S. Appl. No. 13/794,931, filed Mar. 12, 2013, Lu, et al.
U.S. Appl. No. 13/794,979, filed Mar. 12, 2013, Alderson, et al.
Toochinda, et al. "A Single-Input Two-Output Feedback Formulation for ANC Problems," Proceedings of the 2001 American Control Conference, Jun. 2001, pp. 923-928, vol. 2, Arlington, VA.
Johns, et al., "Continuous-Time LMS Adaptive Recursive Filters," IEEE Transactions on Circuits and Systems, Jul. 1991, pp. 769-778, vol. 38, No. 7, IEEE Press, Piscataway, NJ.
Shoval, et al., "Comparison of DC Offset Effects in Four LMS Adaptive Algorithms," IEEE Transactions on Circuits and Systems II: Analog and Digital Processing, Mar. 1995, pp. 176-185, vol. 42, Issue 3, IEEE Press, Piscataway, NJ.
Mali, Dilip, "Comparison of DC Offset Effects on LMS Algorithm and its Derivatives," International Journal of Recent Trends in Engineering, May 2009, pp. 323-328, vol. 1, No. 1, Academy Publisher.
Kates, James M., "Principles of Digital Dynamic Range Compression," Trends in Amplification, Spring 2005, pp. 45-76, vol. 9, No. 2, Sage Publications.
Gao, et al., "Adaptive Linearization of a Loudspeaker," IEEE International Conference on Acoustics, Speech, and Signal Processing, Apr. 14-17, 1991, pp. 3589-3592, Toronto, Ontario, CA.
Silva, et al., "Convex Combination of Adaptive Filters With Different Tracking Capabilities," IEEE International Conference on Acoustics, Speech, and Signal Processing, Apr. 15-20, 2007, pp. IIII 925-III 928, vol. 3, Honolulu, HI, USA.
Akhtar, et al., "A Method for Online Secondary Path Modeling in Active Noise Control Systems," IEEE International Symposium on Circuits and Systems, May 23-26, 2005, pp. 264-267, vol. 1, Kobe, Japan.
Davari, et al., "A New Online Secondary Path Modeling Method for Feedforward Active Noise Control Systems," IEEE International Conference on Industrial Technology, Apr. 21-24, 2008, pp. 1-6, Chengdu, China.
Lan, et al., "An Active Noise Control System Using Online Secondary Path Modeling With Reduced Auxiliary Noise," IEEE Signal Processing Letters, Jan. 2002, pp. 16-18, vol. 9, Issue 1, IEEE Press, Piscataway, NJ.
Liu, et al., "Analysis of Online Secondary Path Modeling With Auxiliary Noise Scaled by Residual Noise Signal," IEEE Transactions on Audio, Speech and Language Processing, Nov. 2010, pp. 1978-1993, vol. 18, Issue 8, IEEE Press, Piscataway, NJ.
U.S. Appl. No. 13/968,007, filed Aug. 15, 2013, Hendrix, et al.
U.S. Appl. No. 14/197,814, filed Mar. 5, 2014, Kaller, et al.
U.S. Appl. No. 14/210,537, filed Mar. 14, 2014, Abdollahzadeh Milani, et al.
U.S. Appl. No. 14/210,589, filed Mar. 14, 2014, Abdollahzadeh Milani, et al.
Black, John W., "An Application of Side-Tone in Subjective Tests of Microphones and Headsets", Project Report No. NM 001 064.01.20, Research Report of the U.S. Naval School of Aviation Medicine, Feb. 1, 1954, 12 pages. (pp. 1-12 in pdf), Pensacola, FL, US.
Peters, Robert W., "The Effect of High-Pass and Low-Pass Filtering of Side-Tone Upon Speaker Intelligibility", Project Report No. NM 001 064.01.25, Research Report of the U.S. Naval School of Aviation Medicine, Aug. 16, 1954, 13 pages (pp. 1-13 in pdf), Pensacola, FL, US.
Lane, et al., "Voice Level: Autophonic Scale, Perceived Loudness, and the Effects of Sidetone", The Journal of the Acoustical Society of America, Feb. 1961, pp. 160-167, vol. 33, No. 2., Cambridge, MA, US.
Liu, et al., "Compensatory Responses to Loudness-shifted Voice Feedback During Production of Mandarin Speech", Journal of the Acoustical Society of America, Oct. 2007, pp. 2405-2412, vol. 122, No. 4.
Paepcke, et al., "Yelling in the Hall: Using Sidetone to Address a Problem with Mobile Remote Presence Systems", Symposium on User Interface Software and Technology, Oct. 16-19, 2011, 10 pages (pp. 1-10 in pdf), Santa Barbara, CA, US.
Therrien, et al., "Sensory Attenuation of Self-Produced Feedback: The Lombard Effect Revisited", PLOS ONE, Nov. 2012, pp. 1-7, vol. 7, Issue 11, e49370, Ontario, Canada.
U.S. Appl. No. 14/228,322, filed Mar. 28, 2014, Alderson, et al.
U.S. Appl. No. 13/762,504, filed Feb. 8, 2013, Abdollahzadeh Milani, et al.
U.S. Appl. No. 13/721,832, filed Dec. 20, 2012, Lu, et al.
U.S. Appl. No. 13/724,656, filed Dec. 21, 2012, Lu, et al.
U.S. Appl. No. 14/252,235, filed Apr. 14, 2014, Lu, et al.
U.S. Appl. No. 13/968,013, filed Aug. 15, 2013, Abdollahzadeh Milani, et al.
U.S. Appl. No. 13/924,935, filed Jun. 24, 2013, Hellman.
U.S. Appl. No. 13/896,526, filed May 17, 2013, Naderi.
U.S. Appl. No. 14/101,955, filed Dec. 10, 2013, Alderson.
U.S. Appl. No. 14/101,777, filed Dec. 10, 2013, Alderson et al.
Abdollahzadeh Milani, et al., "On Maximum Achievable Noise Reduction in ANC Systems", 2010 IEEE International Conference on Acoustics Speech and Signal Processing, Mar. 14-19, 2010, pp. 349-352, Dallas, TX, US.
Cohen, Israel, "Noise Spectrum Estimation in Adverse Environments: Improved Minima Controlled Recursive Averaging", IEEE Transactions on Speech and Audio Processing, Sep. 2003, pp. 1-11, vol. 11, Issue 5, Piscataway, NJ, US.
Ryan, et al., "Optimum Near-Field Performance of Microphone Arrays Subject to a Far-Field Beampattern Constraint", J. Acoust. Soc. Am., Nov. 2000, pp. 2248-2255, 108 (5), Pt. 1, Ottawa, Ontario, Canada.
Cohen, et al., "Noise Estimation by Minima Controlled Recursive Averaging for Robust Speech Enhancement", IEEE Signal Processing Letters, Jan. 2002, pp. 12-15, vol. 9, No. 1, Piscataway, NJ, US.
Martin, Rainer, "Noise Power Spectral Density Estimation Based on Optimal Smoothing and Minimum Statistics", IEEE Transactions on Speech and Audio Processing, Jul. 2001, pp. 504-512, vol. 9, No. 5, Piscataway, NJ, US.
Martin, Rainer, "Spectral Subtraction Based on Minimum Statistics", Signal Processing VII Theories and Applications, Proceedings of EUSIPCO-94, 7th European Signal Processing Conference, Sep. 13-16, 1994, pp. 1182-1185, vol. III, Edinburgh, Scotland, U.K.
Booij, et al., "Virtual sensors for local, three dimensional, broadband multiple-channel active noise control and the effects on the quiet zones", Proceedings of the International Conference on Noise and Vibration Engineering, ISMA 2010, Sep. 20-22, 2010, pp. 151-166, Leuven.
Kuo, et al., "Residual noise shaping technique for active noise control systems", J. Acoust. Soc. Am. 95 (3), Mar. 1994, pp. 1665-1668.
Lopez-Caudana, Edgar Omar, "Active Noise Cancellation: The Unwanted Signal and The Hybrid Solution", Adaptive Filtering Applications, Dr. Lino Garcia (Ed.), Jul. 2011, pp. 49-84, ISBN: 978-953-307-306-4, InTech.
Senderowicz, et al., "Low-Voltage Double-Sampled Delta-Sigma Converters", IEEE Journal on Solid-State Circuits, Dec. 1997, pp. 1907-1919, vol. 32, No. 12, Piscataway, NJ.
Hurst, et al., "An improved double sampling scheme for switched-capacitor delta-sigma modulators", 1992 IEEE Int. Symp. On Circuits and Systems, May 10-13, 1992, vol. 3, pp. 1179-1182, San Diego, CA.

\* cited by examiner

MIC COVERING DETECTION IN PERSONAL AUDIO DEVICES

This U.S. Patent Application Claims priority under 35 U.S.C. §119(e) to U.S. Provisional Patent Application Ser. No. 61/493,162 filed on Jun. 3, 2011.

BACKGROUND OF THE INVENTION

1. Field of the Invention

The present invention relates generally to personal audio devices such as wireless telephones that include noise cancellation, and more specifically, to a personal audio device in which obstruction of one of the microphones used for noise cancellation is detected.

2. Background of the Invention

Wireless telephones, such as mobile/cellular telephones, cordless telephones, and other consumer audio devices, such as mp3 players, are in widespread use. Performance of such devices with respect to intelligibility can be improved by providing noise canceling using a microphone to measure ambient acoustic events and then using signal processing to insert an anti-noise signal into the output of the device to cancel the ambient acoustic events.

Since the acoustic environment around personal audio devices such as wireless telephones can change dramatically, depending on the sources of noise that are present and the position of the device itself, it is desirable to adapt the noise canceling to take into account such environmental changes. However, adaptive noise canceling circuits can be complex, consume additional power and can generate undesirable results under certain circumstances.

Therefore, it would be desirable to provide a personal audio device, including a wireless telephone, that provides noise cancellation in a variable acoustic environment.

SUMMARY OF THE INVENTION

The above stated objective of providing a personal audio device providing noise cancellation in a variable acoustic environment, is accomplished in a personal audio device, a method of operation, and an integrated circuit.

The personal audio device includes a housing, with a transducer mounted on the housing for reproducing an audio signal that includes both source audio for playback to a listener and an anti-noise signal for countering the effects of ambient audio sounds in an acoustic output of the transducer. A reference microphone is mounted on the housing to provide a reference microphone signal indicative of the ambient audio sounds. The personal audio device further includes an adaptive noise-canceling (ANC) processing circuit within the housing for adaptively generating an anti-noise signal from the reference microphone signal such that the anti-noise signal causes substantial cancellation of the ambient audio sounds. An error microphone can also be included for correcting for the electro-acoustic path from the output of the processing circuit through the transducer. The ANC processing circuit monitors the content of the ambient audio received from the reference microphone and/or the error microphone, and/or the output of a microphone provided for capturing near-end speech if the personal audio device is a wireless telephone. By comparing the audio received from two different microphones, the ANC processing circuit can determine if one of the noise-canceling microphones is covered and take action to prevent the anti-noise signal from adapting incorrectly or generating an undesirable output.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses noise canceling techniques and circuits that can be implemented in a personal audio device, such as a wireless telephone. The personal audio device includes an adaptive noise canceling (ANC) circuit that measures the ambient acoustic environment and generates a signal that is injected in the speaker (or other transducer) output to cancel ambient acoustic events. A reference microphone is provided to measure the ambient acoustic environment and an error microphone may be included to provide estimation of an electro-acoustical path from the output of the ANC circuit through the speaker. The ANC circuit monitors the content of at least two of the reference microphone signal, the error microphone signal and a speech microphone signal provided for capturing near-end speech, in order to determine whether one of the reference microphone or the error microphone are obstructed, e.g., covered with a finger or other obstruction.

Figure 1:
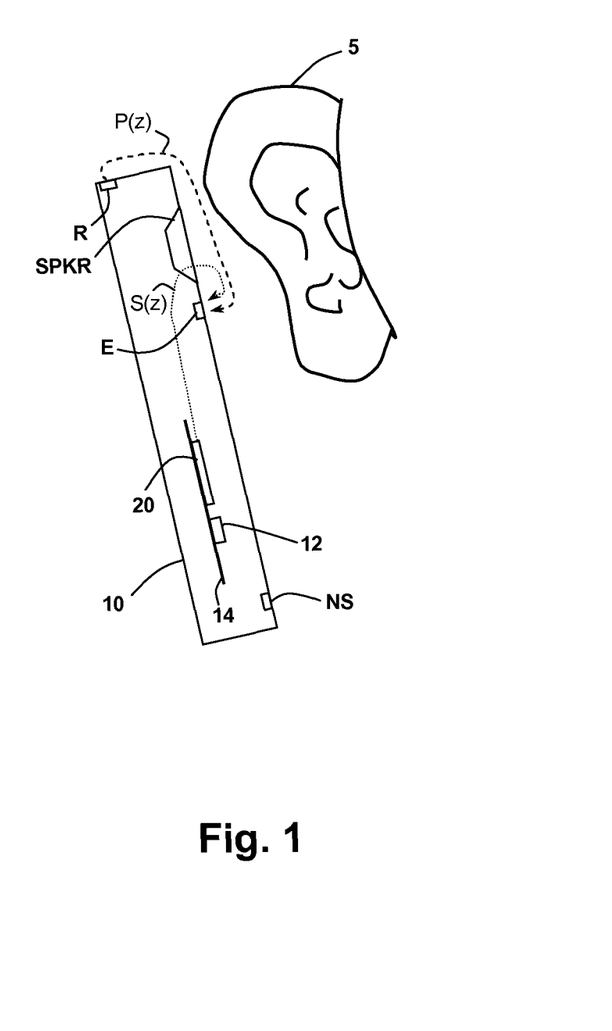
FIG. 1 is an illustration of a wireless telephone 10 in accordance with an embodiment of the present invention.

Referring now to FIG. 1, a wireless telephone 10 is illustrated in accordance with an embodiment of the present invention is shown in proximity to a human ear 5. Illustrated wireless telephone 10 is an example of a device in which techniques in accordance with embodiments of the invention may be employed, but it is understood that not all of the elements or configurations embodied in illustrated wireless telephone 10, or in the circuits depicted in subsequent illustrations, are required in order to practice the invention recited in the claims. Wireless telephone 10 includes a transducer such as speaker SPKR that reproduces distant speech received by wireless telephone 10, along with other local audio event such as ringtones, stored audio program material, injection of near-end speech (i.e., the speech of the user of wireless telephone 10) to provide a balanced conversational perception, and other audio that requires reproduction by wireless telephone 10, such as sources from web-pages or other network communications received by wireless telephone 10 and audio indications such as battery low and other system event notifications. A near-speech microphone NS is provided to capture near-end speech, which is transmitted from wireless telephone 10 to the other conversation participant(s).

Wireless telephone 10 includes adaptive noise canceling (ANC) circuits and features that inject an anti-noise signal into speaker SPKR to improve intelligibility of the distant speech and other audio reproduced by speaker SPKR. A reference microphone R is provided for measuring the ambient acoustic environment, and is positioned away from the typical position of a user's mouth, so that the near-end speech is minimized in the signal produced by reference microphone R. A third microphone, error microphone E is provided in order to further improve the ANC operation by providing a measure of the ambient audio combined with the audio reproduced by speaker SPKR close to ear 5, when wireless telephone 10 is in close proximity to ear 5. Exemplary circuit 14 within wireless telephone 10 include an audio CODEC integrated circuit 20 that receives the signals from reference microphone R, near speech microphone NS and error microphone E and interfaces with other integrated circuits such as an RF integrated circuit 12 containing the wireless telephone transceiver. In other embodiments of the invention, the circuits and techniques disclosed herein may be incorporated in a single integrated circuit that contains control circuits and other functionality for implementing the entirety of the personal audio device, such as an MP3 player-on-a-chip integrated circuit.

In general, the ANC techniques of the present invention measure ambient acoustic events (as opposed to the output of speaker SPKR and/or the near-end speech) impinging on reference microphone R, and by also measuring the same ambient acoustic events impinging on error microphone E, the ANC processing circuits of illustrated wireless telephone 10 adapt an anti-noise signal generated from the output of reference microphone R to have a characteristic that minimizes the amplitude of the ambient acoustic events at error microphone E. Since acoustic path $P(z)$ extends from reference microphone R to error microphone E, the ANC circuits are essentially estimating acoustic path $P(z)$ combined with removing effects of an electro-acoustic path $S(z)$ that represents the response of the audio output circuits of CODEC IC 20 and the acoustic/electric transfer function of speaker SPKR including the coupling between speaker SPKR and error microphone E in the particular acoustic environment, which is affected by the proximity and structure of ear 5 and other physical objects and human head structures that may be in proximity to wireless telephone 10, when wireless telephone is not firmly pressed to ear 5. While the illustrated wireless telephone 10 includes a two microphone ANC system with a third near speech microphone NS, some aspects of the present invention may be practiced in a system that does not include separate error and reference microphones, or a wireless telephone uses near speech microphone NS to perform the function of the reference microphone R. Also, in personal audio devices designed only for audio playback, near speech microphone NS will generally not be included, and the near-speech signal paths in the circuits described in further detail below can be omitted, without changing the scope of the invention, other than to limit the options provided for input to the microphone covering detection schemes.

Figure 2:
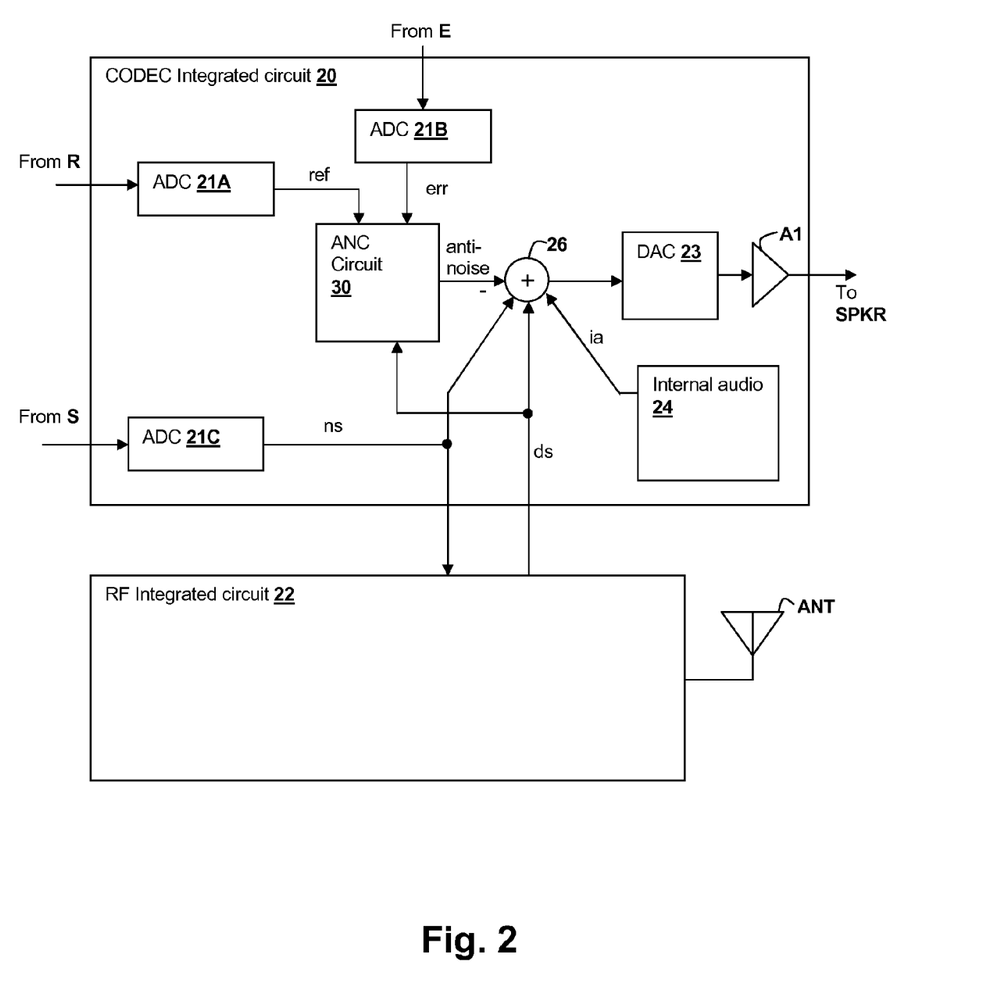
FIG. 2 is a block diagram of circuits within wireless telephone 10 in accordance with an embodiment of the present invention.

Referring now to FIG. 2, circuits within wireless telephone 10 are shown in a block diagram. CODEC integrated circuit 20 includes an analog-to-digital converter (ADC) 21A for receiving the reference microphone signal and generating a digital representation ref of the reference microphone signal, an ADC 21B for receiving the error microphone signal and generating a digital representation err of the error microphone signal, and an ADC 21C for receiving the near speech microphone signal and generating a digital representation ns of the error microphone signal. CODEC IC 20 generates an output for driving speaker SPKR from an amplifier A1, which amplifies the output of a digital-to-analog converter (DAC) 23 that receives the output of a combiner 26. Combiner 26 combines audio signals from internal audio sources 24, the anti-noise signal generated by ANC circuit 30, which by convention has the same polarity as the noise in reference microphone signal ref and is therefore subtracted by combiner 26, a portion of near speech signal ns so that the user of wireless telephone 10 hears their own voice in proper relation to downlink speech ds, which is received from radio frequency (RF) integrated circuit 22 and is also combined by combiner 26. Near speech signal is also provided to RF integrated circuit 22 and is transmitted as uplink speech to the service provider via antenna ANT.

Figure 3:
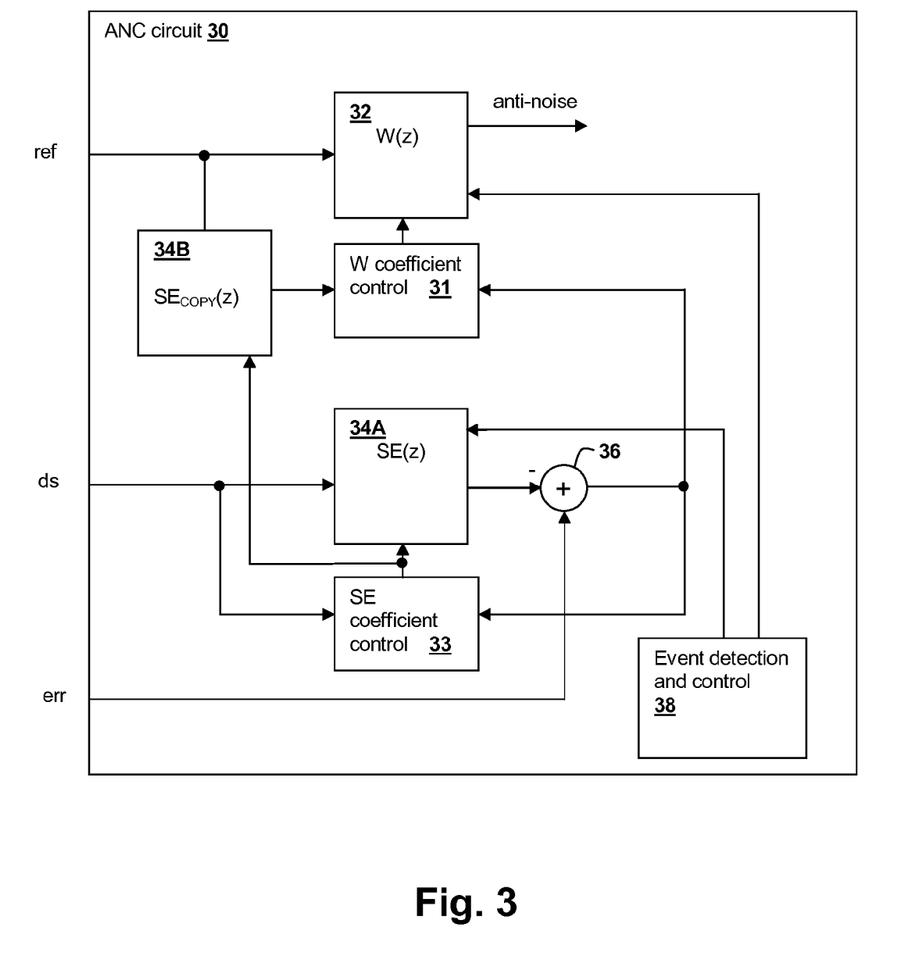
FIG. 3 is a block diagram depicting signal processing circuits and functional blocks within ANC circuit 30 of CODEC integrated circuit 20 of FIG. 2 in accordance with an embodiment of the present invention.

Referring now to FIG. 3, details of ANC circuit 30 are shown in accordance with an embodiment of the present invention. Adaptive filter 32 receives reference microphone signal ref and under ideal circumstances, adapts its transfer function $W(z)$ to be $P(z)/S(z)$ to generate the anti-noise signal. The coefficients of adaptive filter 32 are controlled by a W coefficient control block 31 that uses a correlation of two signals to determine the response of adaptive filter 32, which generally minimizes the error, in a least-mean squares sense, between those components of reference microphone signal ref and error microphone signal err. The signals compared by W coefficient control block 31 are the reference microphone signal ref as shaped by a copy of an estimate of the response of path $S(z)$ provided by filter 34B and another signal that includes error microphone signal err. By transforming reference microphone signal ref with a copy of the estimate of the response of path $S(z)$, $SE_{COPY}(z)$, and minimizing the difference between the resultant signal and error microphone signal err, adaptive filter 32 adapts to the desired response of $P(z)/S(z)$. In addition to error microphone signal err the signal compared to the output of filter 34B by W coefficient control block 31 includes an inverted amount of downlink audio signal ds that has been processed by filter response $SE(z)$, of which response $SE_{COPY}(z)$ is a copy. By injecting an inverted amount of downlink audio signal ds adaptive filter 32 is prevented from adapting to the relatively large amount of downlink audio present in error microphone signal err and by transforming that inverted copy of downlink audio signal ds with the estimate of the response of path $S(z)$, the downlink audio that is removed from error microphone signal err before comparison should match the expected version of downlink audio signal ds reproduced at error microphone signal err, since the electrical and acoustical path of $S(z)$ is the path taken by downlink audio signal ds to arrive at error microphone E.

To implement the above, adaptive filter 34A has coefficients controlled by SE coefficient control block 33, which compares downlink audio signal ds and error microphone signal err after removal of the above-described filtered downlink audio signal ds, that has been filtered by adaptive filter 34A to represent the expected downlink audio delivered to error microphone E, and which is removed from the output of adaptive filter 34A by a combiner 36. SE coefficient control block 33 correlates the actual downlink speech signal ds with the components of downlink audio signal ds that are present in error microphone signal err. Adaptive filter 34A is thereby adapted to generate a signal from downlink audio signal ds, that when subtracted from error microphone signal err, contains the content of error microphone signal err that is not due to downlink audio signal ds. Event detection and control logic 38 perform various actions in response to various events in conformity with various embodiments of the invention, as will be disclosed in further detail below.

Since adaptive filter 32 generates the anti-noise signal from reference microphone signal ref, if reference microphone R is covered by a finger or other obstruction, W coefficient control 31 will either have no input to drive its adaptation from reference microphone signal ref, or the input will be sounds made by the movement of the obstruction across reference microphone R. The covering of reference microphone R may also cause reference microphone signal to primarily reflect the output of speaker SPKR due to internal coupling, which is very undesirable, as the anti-noise signal would, under those conditions, generally attempt to cancel downlink speech signal ds. In any of the above circumstances, W cannot properly be adapted without a proper reference microphone signal ref and may generate an anti-noise signal that is undesirable. If error microphone E is covered by an obstruction, such as a portion of listener's ear 5, then SE coefficient control 33 will adapt incorrectly, which will also cause W coefficient control 31 to also adapt incorrectly.

Figure 4:
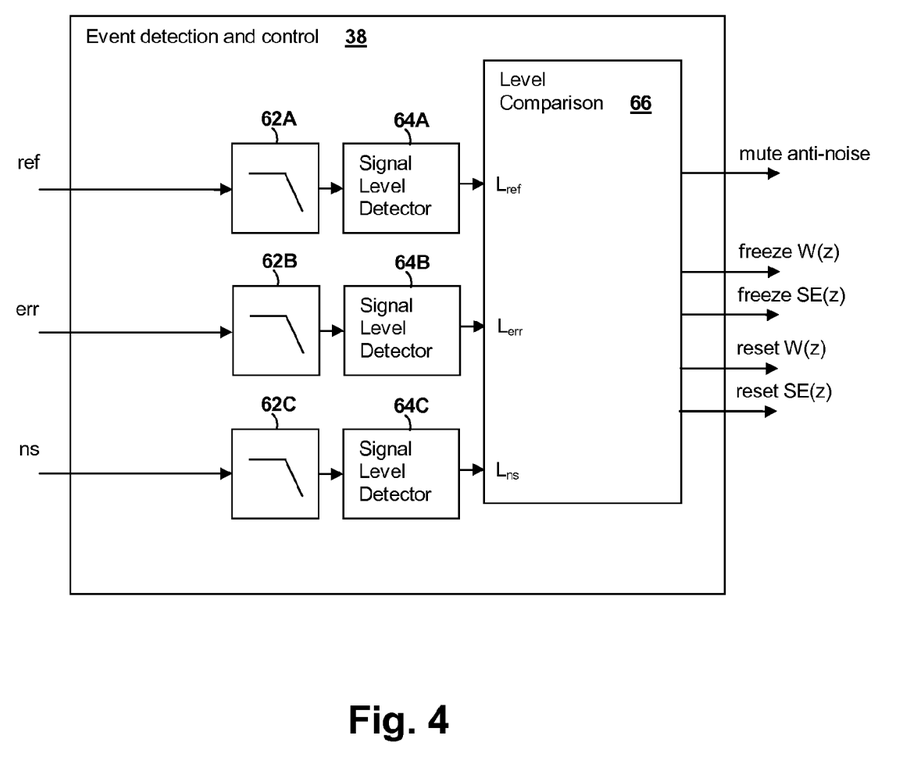
FIG. 4 is a block diagram illustrating functional blocks associated with mic covering operations in the circuit of FIG. 3 in accordance with an embodiment of the present invention.

Referring now to FIG. 4, details of a technique for detecting microphone obstruction are shown in accordance with an embodiment of the present invention as a block diagram of functional blocks, which may be implemented as an algorithm by a processor that implements error detection and control block, but at least a portion of which could alternatively be implemented in dedicated circuits. Each of the microphone signals, reference microphone signal ref, error microphone signal err and near-end speech microphone signal ns, are provided as an input to a corresponding low-pass filter 62A, 62B or 62C, respectively, which remove components of the corresponding microphone signals having frequencies above a cut-off frequency, which may be predetermined, e.g. 100 Hz, or which may be adapted to ambient conditions. In any case, the cut-off frequency should generally be below a frequency at which multi-path phase differences and reflections may generate amplitude differences in the microphone signals, and at which the directivity of the microphones may come into play. The outputs of low-pass filters 62A, 62B and 62C are provided to corresponding signal level detectors 64A, 64B and 64C, respectively, which provide signals indicative of the amplitude of low-frequency components in each of the microphone signals: level signal $L_{ref}$ indicative of the amplitude of low-frequency components in reference microphone signal ref, level signal $L_{err}$ indicative of the amplitude of low-frequency components in error microphone signal err, and level signal $L_{ns}$ indicative of the amplitude of low-frequency components in near-end speech microphone signal ns. Level signals $L_{ref}$, $L_{err}$ and $L_{ns}$ are provided to a level comparison block 66, which generates control output signals that signal the ANC circuits described above to mute the ANC action, i.e., turn off the anti-noise signal, freeze adapting of W(z) and/or SE(z) and reset the coefficients of W(z) and/or SE(z), depending on the particular detected conditions.

Figure 5:
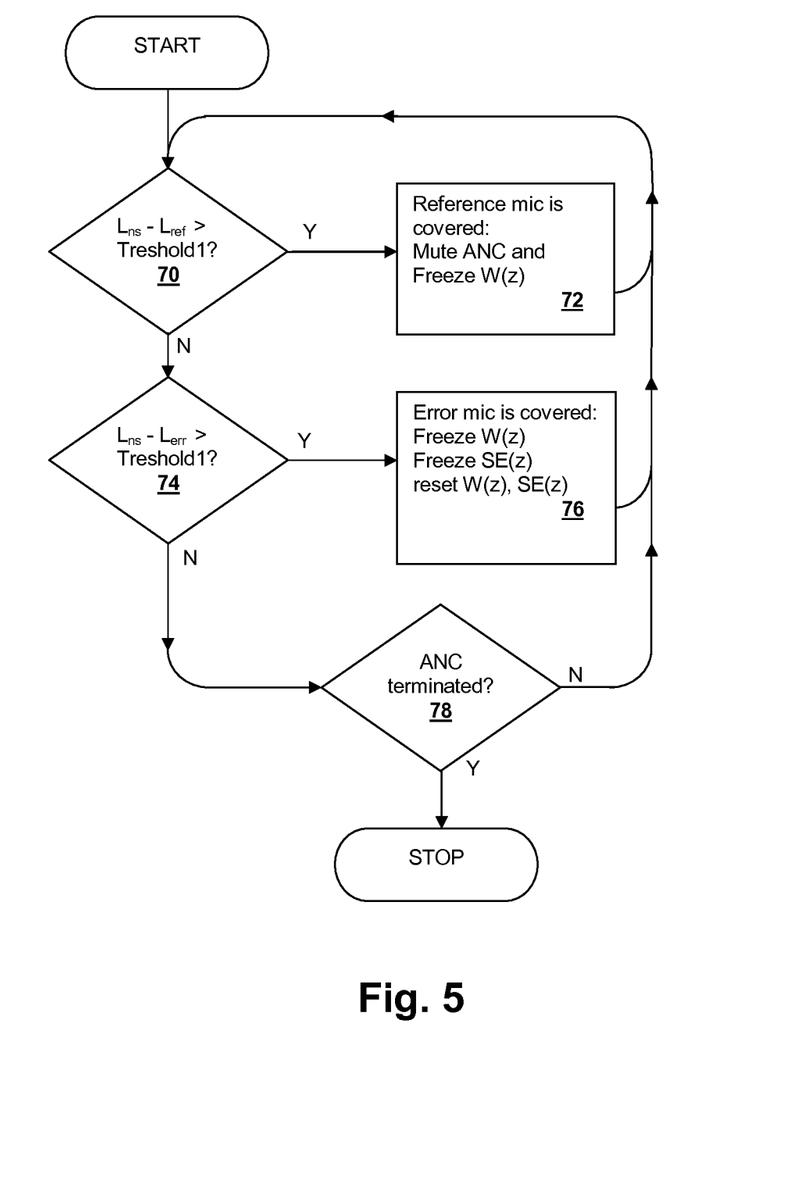
FIG. 5 is a flowchart of a method of determining that a microphone has been obstructed, in accordance with an embodiment of the present invention.

Referring now to FIG. 5, details of a technique for detecting microphone obstruction are shown in accordance with an embodiment of the present invention in a flowchart. If level signal $L_{ns}$, is larger than level signal $L_{ref}$ by a predetermined threshold (decision 70), then reference microphone R is assumed to be obstructed and action is taken to mute the ANC system and freeze the adaptation of W(z) (step 72). If level signal $L_{ns}$, is larger than level signal $L_{err}$ by a predetermined threshold (decision 74), then error microphone E is assumed to be obstructed and action is taken to freeze the adaptation of W(z) and SE(z), as well as resetting the coefficients of both W(z) and SE(z) to predetermined values (step 76). Until ANC operation is terminated (decision 78), e.g., the wireless telephone is turned off, steps 70-78 are repeated. The flowchart of FIG. 5 is only one example of a detection methodology that may be employed to determine whether microphones are obstructed. For example, in devices without a speech microphone ns, the low frequency component of reference microphone signal ref and error microphone signal err could be compared and action taken if the corresponding low frequency level signal $L_{ref}$ or $L_{err}$ exceeded the other by a predetermined amount, indicating that the other microphone is covered. Further, the actions taken may be different, e.g., mute ANC alone, or reset all adaptive filters and mute ANC under any covering condition, etc., without deviating from the spirit and scope of the invention.

Figure 6:
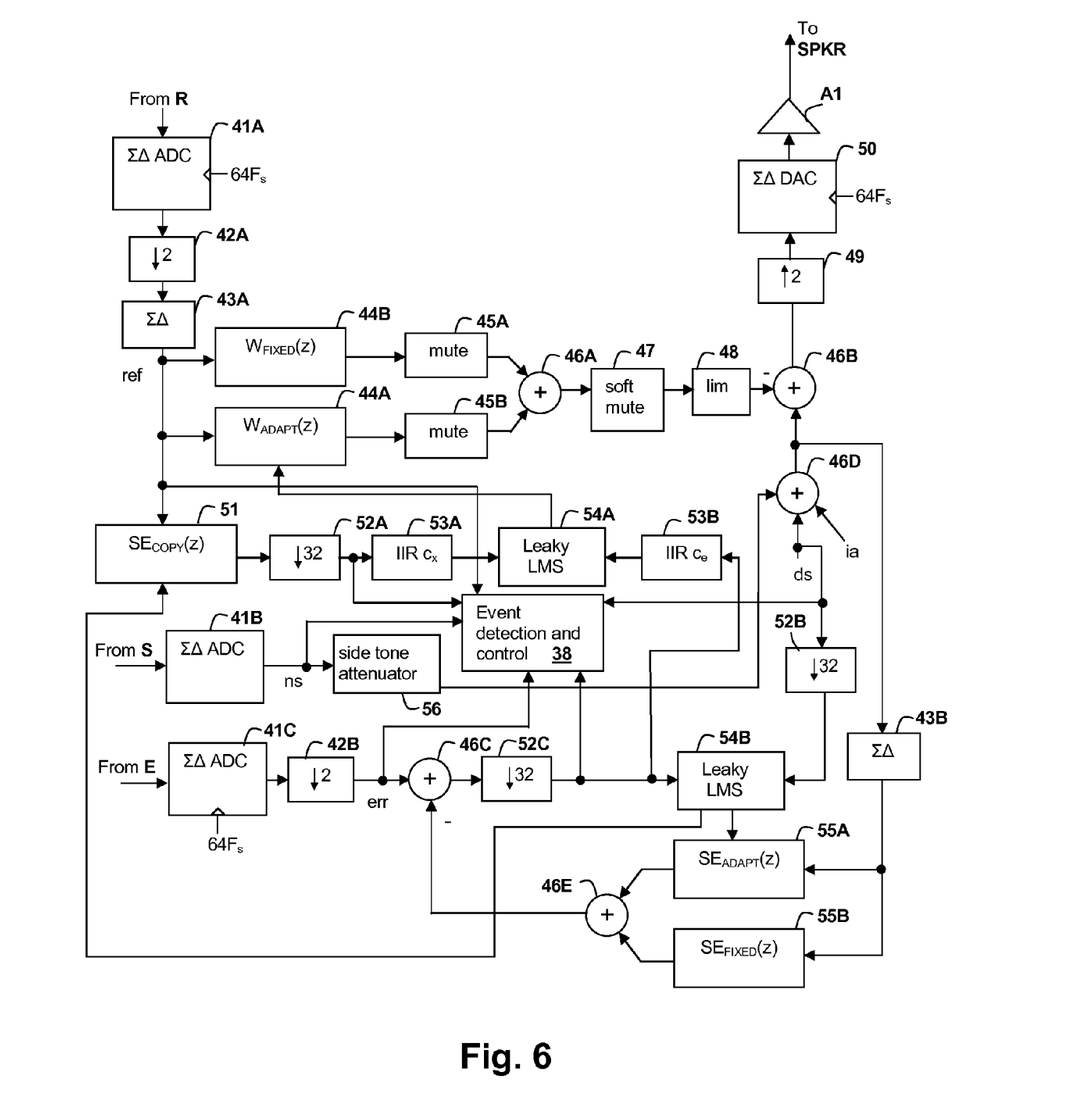
FIG. 6 is a block diagram depicting signal processing circuits and functional blocks within an integrated circuit in accordance with an embodiment of the present invention.

Referring now to FIG. 6, a block diagram of an ANC system in accordance with an embodiment of the invention is shown, as may be implemented within CODEC integrated circuit 20. Reference microphone signal ref is generated by a delta-sigma ADC 41A that operates at 64 times oversampling and the output of which is decimated by a factor of two by a decimator 42A to yield a 32 times oversampled signal. A delta-sigma shaper 43A spreads the energy of images outside of bands in which a resultant response of a parallel pair of adaptive filter stages 44A and 44B will have significant response. Filter stage 44B has a fixed response $W_{FIXED}(z)$ that is generally predetermined to provide a starting point at the estimate of P(z)/S(z) for the particular design of wireless telephone 10 for a typical user. An adaptive portion $W_{ADAPT}(z)$ of the response of the estimate of P(z)/S(z) is provided by adaptive filter stage 44A, which is controlled by a leaky least-means-squared (LMS) coefficient controller 54A. Leaky LMS coefficient controller 54A is leaky in that the response normalizes to flat or otherwise predetermined response over time when no error input is provided to cause leaky LMS coefficient controller 54A to adapt. Providing a leaky controller prevents long-term instabilities that might arise under certain environmental conditions, and in general makes the system more robust against particular sensitivities of the ANC response.

As in the example of FIG. 3, in the system depicted in FIG. 6, the reference microphone signal is filtered by a copy $SE_{COPY}(z)$ of the estimate of S(z), by a filter 51 that has a response $SE_{COPY}(z)$, the output of which is decimated by a factor of 32 by a decimator 52A to yield a baseband audio signal that is provided, through an infinite impulse response (IIR) filter 53A to leaky LMS MA. The error microphone signal err is generated by a delta-sigma ADC 41C that operates at 64 times oversampling and the output of which is decimated by a factor of two by a decimator 42B to yield a 32 times oversampled signal. As in the system of FIG. 3, an amount of downlink audio ds that has been filtered by an adaptive filter to apply response S(z) is removed from error microphone signal err by a combiner 46C, the output of which is decimated by a factor of 32 by a decimator 52C to yield a baseband audio signal that is provided, through an infinite impulse response (IIR) filter 53B to leaky LMS 54A. Response S(z) is produced by another parallel set of adaptive filter stages 55A and 55B, one of which, filter stage 55B has fixed response $SE_{FIXED}(z)$, and the other of which, filter stage 55A has an adaptive response $SE_{ADAPT}(z)$ controlled by leaky LMS coefficient controller 54B. The outputs of adaptive filter stages 55A and 55B are combined by a combiner 46E. Similar to the implementation of filter response W(z) described above, response $SE_{FIXED}(z)$ is generally a predetermined response known to provide a suitable starting point under various operating conditions for electrical/acoustical path S(z). A separate control value is provided in the system of FIG. 6 to control adaptive filter 51 that has a response $SE_{COPY}(z)$, and which is shown as a single adaptive filter stage. However, adaptive filter 51 could alternatively be implemented using two parallel stages and the same control value used to control adaptive filter stage 55A could then be used to control the adaptive stage in the implementation of adaptive filter 51. The inputs to leaky LMS control block 54B are also at baseband, provided by decimating downlink audio signal ds by a decimator 52B that decimates by a factor of 32 after a combiner 46C has removed the signal generated from the combined outputs of adaptive filter stage 55A and filter stage 55B that are combined by another combiner 46E. The output of combiner 46C represents error microphone signal err with the components due to downlink audio signal ds removed, which is provided to LMS control block MB after decimation by decimator 52B. The other input to LMS control block MB is the baseband signal produced by decimator 52C.

The above arrangement of baseband and oversampled signaling provides for simplified control and reduced power consumed in the adaptive control blocks, such as leaky LMS controllers 54A and 54B, while providing the tap flexibility afforded by implementing adaptive filter stages 44A-44B, 55A-55B and adaptive filter 51 at the oversampled rates. The remainder of the system of FIG. 6 includes a combiner 46D that combines downlink audio ds with internal audio is and a portion of near-end speech that has been generated by sigma-delta ADC 41B and filtered by a sidetone attenuator 56 to prevent feedback conditions. The output of combiner 46D is shaped by a sigma-delta shaper 43B that provides inputs to filter stages 55A and 55B that has been shaped to shift images outside of bands where filter stages 55A and 55B will have significant response.

In accordance with an embodiment of the invention, the output of combiner 46D is also combined with the output of adaptive filter stages 44A-44B that have been processed by a control chain that includes a corresponding hard mute block 45A, 45B for each of the filter stages, a combiner 46A that combines the outputs of hard mute blocks 45A, 45B, a soft mute 47 and then a soft limiter 48 to produce the anti-noise signal that is subtracted by a combiner 46B with the source audio output of combiner 46D. The output of combiner 46B is interpolated up by a factor of two by an interpolator 49 and then reproduced by a sigma-delta DAC 50 operated at the 64× oversampling rate. The output of DAC 50 is provided to amplifier A1, which generates the signal delivered to speaker SPKR.

Event detection and control block 38 receives various inputs for event detection, such as the output of decimator 52C, which represents how well the ANC system is canceling acoustic noise as measured at error microphone E, the output of decimator 52A, which represents the ambient acoustic environment shaped by path SE(z), downlink audio signal ds, and near-end speech signal ns. Event detection and control block 38 also receives error microphone signal err, after removal of the components of error microphone signal due to downlink audio signal ds, and also receives reference microphone signal ref. Event detection and control block 38 also includes circuits and/or processing algorithms implementing the above-described microphone covering detection and ANC control techniques. Depending on detected acoustic events, or other environmental factors such as the position of wireless telephone 10 relative to ear 5 event detection and control block 38 will generate the control outputs described above, along with various other outputs, which are not shown in FIG. 6 for clarity, but that may control, among other elements, whether hard mute blocks 45A-45B are applied, characteristics of mute 47 and limiter 48, whether leaky LMS control blocks 54A and 54B are frozen or reset, and in some embodiments of the invention, what fixed responses are selected for the fixed portion of the adaptive filters, e.g., adaptive filter stages 44B and 55B.

Each or some of the elements in the system of FIG. 6, as well in as the exemplary circuits of FIGS. 2-4, can be implemented directly in logic, or by a processor such as a digital signal processing (DSP) core executing program instructions that perform operations such as the adaptive filtering and LMS coefficient computations. While the DAC and ADC stages are generally implemented with dedicated mixed-signal circuits, the architecture of the ANC system of the present invention will generally lend itself to a hybrid approach in which logic may be, for example, used in the highly oversampled sections of the design, while program code or microcode-driven processing elements are chosen for the more complex, but lower rate operations such as computing the taps for the adaptive filters and/or responding to detected events such as those described herein.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A personal audio device, comprising:
a personal audio device housing;
a transducer mounted on the housing for reproducing an audio signal including both source audio for playback to a listener and an anti-noise signal for countering the effects of ambient audio sounds in the proximity of an acoustic output of the transducer;
a plurality of microphones, including a first microphone mounted on the housing that, when unobstructed, provides a first microphone signal indicative of the ambient audio sounds, wherein a second microphone of the plurality of microphones is mounted on the housing and that, when unobstructed, provides a second microphone signal indicative of the ambient audio sounds; and
a processing circuit that implements a first adaptive filter having a response that generates the anti-noise signal from the first microphone signal, a second adaptive filter for generating shaped source audio from the source audio and a combiner for removing the shaped source audio from the second microphone signal to generate an error signal provided to a coefficient control block that controls coefficients of the first adaptive filter, wherein the processing circuit implements a first signal level detector for detecting a first amplitude of the first microphone signal to generate a first microphone level signal and at second signal level detector for detecting a second amplitude of the second microphone signal to generate a second microphone level signal, and wherein the processing circuit further compares the first microphone level signal and a signal level of one of the plurality of microphones other than the first microphone and, in response to determining that a first differences between the first microphone level signal and the signal level of the one of the plurality of microphones other than the first microphone indicates that the first microphone is at least partially obstructed, halts adaptation of the first adaptive filter so that first coefficients of the first adaptive filter are maintained at their existing values to prevent the anti-noise signal from being generated erroneously, and wherein the processing circuit compares the second microphone level signal and a signal level of one of the plurality of microphones other than the second microphone, and in response to determining that a second difference between the second microphone level signal and the signal level of the one of the plurality of microphones other than the second microphone indicates that the second microphone is at least partially obstructed, halts adaptation of the first adaptive filter and the second adaptive filter and resets the first coefficients and the second coefficients to predetermined values.

2. The personal audio device of claim 1, wherein the first microphone is a reference microphone that provides a reference microphone signal indicative of the ambient audio sounds, and wherein the processing circuit generates the anti-noise signal from the reference microphone signal.

3. The personal audio device of claim 2, wherein the second microphone is an error microphone that provides an error microphone signal indicative of the acoustic output of the transducer, wherein the processing circuit corrects the anti-noise signal for changes due to an electro-acoustic path through the transducer using the error microphone signal, and wherein the processing circuit determines the first differences between the error microphone signal and the reference microphone signal.

4. The personal audio device of claim 3, wherein the plurality of microphones includes a speech microphone provided for capturing near end speech of a user of the personal audio device and providing a speech signal indicative of the near end speech, and wherein the processing circuit halts the adaptation of the first adaptive filter in response to determining that differences between a first level of the ambient audio sounds present in the reference microphone signal, a second level of the ambient audio sounds present in the error microphone signal, and a third level of the ambient audio sounds present in the speech signal indicate that the reference microphone or the error microphone is at least partially obstructed.

5. The personal audio device of claim 1, wherein the processing circuit further, in response to determining that the first difference between the first microphone level signal and the signal level of the one of the plurality of microphones other than the first microphone indicates that the first microphone is at least partially obstructed, mutes the anti-noise signal.

6. The personal audio device of claim 1, wherein the processing circuit further filters the first microphone signal and the second microphone signal to retain only frequencies below a cut-off frequency at inputs to the first signal level detector and the second signal level detector in order to determine that the error microphone is at least partially obstructed.

7. The personal audio device of claim 6, wherein the cutoff frequency is substantially equal to 100 Hz.

8. The personal audio device of claim 1, wherein the personal audio device is a wireless telephone further comprising a transceiver for receiving the source audio as a downlink audio signal.

9. The personal audio device of claim 1, wherein the personal audio device is an audio playback device, wherein the source audio is a program audio signal.

10. A method of preventing production of erroneous anti-noise in a personal audio device having adaptive noise canceling, the method comprising:
producing an acoustic output with a transducer, the acoustic output including both source audio for playback to a listener and an anti-noise signal for countering the effects of ambient audio sounds in the proximity of an acoustic output of the transducer;
first measuring the ambient audio sounds with a first microphone of a plurality of microphones to generate a first microphone signal;
generating the anti-noise signal from the first microphone signal with a first adaptive filter;
second measuring the ambient audio sounds with second microphone of the plurality of microphones to generate a second microphone signal;
first detecting a first amplitude of the first microphone signal to generate a first microphone level signal;
second detecting a second amplitude of the at least one second microphone signal to generate at least one second microphone level signal;
first comparing the first microphone level signal and a signal level of one of the plurality of microphones other than the first microphone to determine a first differences between the first microphone level signal and the signal level of the one of the plurality of microphones other than the first microphone;
determining whether the first microphone is at least partially obstructed from a result of the first comparing;
first taking action in response to determining that the first microphone is at least partially obstructed, by halting adaptation of the first adaptive filter so that first coefficients of the adaptive filter are maintained at their existing values to prevent the anti-noise signal from being generated erroneously;
second comparing the second microphone level signal and a signal level of one of the plurality of microphones other than the second microphone to determine a second differences between the second microphone level signal and the signal level of the one of the plurality of microphones other than the second microphone;
determining whether the second microphone is at least partially obstructed from a result of the second comparing; and
second taking action in response to determining that the second microphone is at least partially obstructed, by halting adaptation of the first adaptive filter and the second adaptive filter and resetting the first coefficients and the second coefficients to predetermined values.

11. The method of claim 10, wherein the first microphone is a reference microphone that provides a reference microphone signal indicative of the ambient audio sounds, and wherein the method further comprises generating the anti-noise signal from the reference microphone signal.

12. The method of claim 11, wherein the second microphone is an error microphone that provides an error microphone signal indicative of the acoustic output of the transducer, wherein the method further corrects the anti-noise signal for changes due to an electro-acoustic path through the transducer using the error microphone signal, and wherein the comparing compares the error microphone signal and the reference microphone signal.

13. The method of claim 12, wherein the plurality of microphones includes a speech microphone provided for capturing near end speech of a user of the personal audio device and providing a speech signal indicative of the near end speech, and wherein the first taking action and the second taking action are performed in response to determining that difference between a first level of the ambient audio sounds present in the reference microphone signal, a second level of the ambient audio sounds present in the error microphone signal, and a third level of the ambient audio sounds present in the speech signal that indicate that the reference microphone or the error microphone is at least partially obstructed.

14. The method of claim 10, wherein the first taking action further, in response to determining that a first differences between the first microphone level signal and the signal level of the one of the plurality of microphones other than the first microphone indicates that the first microphone is at least partially obstructed, mutes the anti-noise signal.

15. The method of claim 10, wherein the comparing further filters the first microphone signal and the second microphone signal to retain only frequencies below a cut-off frequency at inputs to the first detecting and the second detecting in order to determine that the first microphone is at least partially obstructed.

16. The method of claim 15, wherein the cutoff frequency is substantially equal to 100 Hz.

17. The method of claim 10, wherein the personal audio device is a wireless telephone, and wherein the method further comprises receiving the source audio as a downlink audio signal.

18. The method of claim 10, wherein the personal audio device is an audio playback device, wherein the source audio is a program audio signal.

19. An integrated circuit for implementing at least a portion of a personal audio device, comprising:
   an output for providing a signal to a transducer including both source audio for playback to a listener and an anti-noise signal for countering the effects of ambient audio sounds in an acoustic output of the transducer;
   a first microphone input of a plurality of microphone inputs for receiving a first microphone signal indicative of the ambient audio sounds from a first microphone;
   a second microphone input of the plurality of microphone inputs for receiving a second microphone signal indicative of the ambient audio sounds from a second microphone; and
   a plurality of microphones, including a first microphone mounted on the housing that, when unobstructed, provides a first microphone signal indicative of the ambient audio sounds, wherein a second microphone of the plurality of microphones is mounted on the housing and that, when unobstructed, provides a second microphone signal indicative of the ambient audio sounds; and
   a processing circuit that implements a first adaptive filter having a response that generates the anti-noise signal from the first microphone signal, a second adaptive filter for generating shaped source audio from the source audio and a combiner for removing the shaped source audio from the second microphone signal to generate an error signal provided to a coefficient control block that controls coefficients of the first adaptive filter, wherein the processing circuit implements a first signal level detector for detecting a first amplitude of the first microphone signal to generate a first microphone level signal and second signal level detector for detecting a second amplitude of the second microphone signal to generate a second microphone level signal, and wherein the processing circuit further compares the first microphone level signal and a signal level of one of the plurality of microphone inputs other than the first microphone input and, in response to determining that a first differences between the first microphone level signal and the signal level of the one of the plurality of microphone inputs other than the first microphone input indicates that the first microphone is at least partially obstructed, halts adaptation of the first adaptive filter so that first coefficients of the first adaptive filter are maintained at their existing values to prevent the anti-noise signal from being generated erroneously, and wherein the processing circuit compares the second microphone level signal and a signal level of one of the plurality of microphones inputs other than the second microphone input, and in response to determining that a second differences between the second microphone level signal and the signal level of the one of the plurality of microphone inputs other than the second microphone input indicates that the second microphone is at least partially obstructed, halts adaptation of the first adaptive filter and the second adaptive filter and resets the first coefficients and the second coefficients to predetermined values.

20. The integrated circuit of claim 19, wherein the first microphone signal is a reference microphone signal indicative of the ambient audio sounds, and wherein the processing circuit generates the anti-noise signal from the reference microphone signal.

21. The integrated circuit of claim 20, wherein the second microphone signal is an error microphone signal indicative of the acoustic output of the transducer, wherein the processing circuit corrects the anti-noise signal for changes due to an electro-acoustic path through the transducer using the error microphone signal, and wherein the processing circuit determines the difference between the error microphone signal and the reference microphone signal.

22. The integrated circuit of claim 21, wherein the plurality of microphone inputs includes a speech microphone input for receiving a speech signal indicative of near end speech, and wherein the processing circuit halts the adaptation of the first adaptive filter in response to determining that differences between a first level of the ambient audio sounds present in the reference microphone signal, a second level of the ambient audio sounds present in the error microphone signal, and a third level of the ambient audio sounds present in the speech signal indicate that the first microphone or the second microphone is at least partially obstructed.

23. The integrated circuit of claim 19, wherein the processing circuit further, in response to determining that a difference between the first microphone level signal and the signal level of the one of the plurality of microphone inputs other than the first microphone input indicates that the first microphone is at least partially obstructed, mutes the anti-noise signal.

24. The integrated circuit of claim 19, wherein the processing circuit further filters the first microphone signal and the second microphone signal to retain only frequencies below a cut-off frequency at inputs to the first signal level detector and the second signal level detector in order to determine that the first microphone is at least partially obstructed.

25. The integrated circuit of claim 24, wherein the cutoff frequency is substantially equal to 100 Hz.

* * * * *